United States Patent [19]

Danko, Jr. et al.

[11] 4,096,502
[45] Jun. 20, 1978

[54] STEREOMETRIC CAMERA SYSTEM

[75] Inventors: Joseph O. Danko, Jr., Baltimore, Md.; Jaime R. Cuzzi, Houston, Tex.

[73] Assignee: Danko Arlington, Inc., Baltimore, Md.

[21] Appl. No.: 692,873

[22] Filed: Jun. 4, 1976

Related U.S. Application Data

[63] Continuation-in-part of Ser. No. 621,785, Oct. 14, 1975, Pat. No. 4,010,481.

[51] Int. Cl.² ............................................. G03B 17/00
[52] U.S. Cl. .................................. 354/203; 354/213; 354/217; 354/275
[58] Field of Search ............... 354/203, 275, 217, 213, 354/216, 212

[56] References Cited

U.S. PATENT DOCUMENTS

| 10,987 | 5/1854 | Holmes | 354/113 X |
|---|---|---|---|
| 408,451 | 8/1889 | Barker | 354/216 X |
| 891,013 | 6/1908 | Smith | 354/113 X |
| 1,140,099 | 5/1915 | Barrier | 354/275 X |
| 1,617,079 | 2/1927 | Powers | 354/213 X |
| 2,150,696 | 3/1939 | Nelson | 354/217 X |

*Primary Examiner*—John Gonzales
*Attorney, Agent, or Firm*—Cushman, Darby & Cushman

[57] ABSTRACT

A camera for use in a stereophotogrammetric assembly including a pair of camera assemblies, each assembly having a pair of cameras located on either side of a flash lamp assembly. Each of the cameras of the assemblies includes a flat transparent plate located in a camera housing, with the camera lens being adjustable with respect to the plate. A resilient plate-like member associated with an overcenter toggle assembly holds a film length against the glass plate for exposure. Apparatus for providing fiducial marks and a film recordation of the lens adjustment — for stereoplotting purposes — is provided including an internal flash mechanism in the camera housing with light piping extending to the glass plate. Film wastage is minimized by the location of the lens centerpoint (which corresponds to the fiducial marking centerpoint) off the horizontal center of the film length to be exposed. The film is provided for the cameras either by a cassette — which has top and bottom portions spring-clipped together that are detachable when the cassette is inserted into the camera, without any light entering the camera — or by a reel assembly. The reel assembly includes an upper reel housing having a pinch roll arrangement that meters the film frames properly into the camera, and a lower reel housing having an advancing assembly, and a lost motion indexing assembly associated with the film advancing assembly.

10 Claims, 15 Drawing Figures

STEREOMETRIC CAMERA SYSTEM

CROSS-REFERENCE TO RELATED APPLICATIONS

This application is a continuation-in-part of application Ser. No. 621,785, filed Oct. 14, 1975 now U.S. Pat. No. 4,010,481.

BACKGROUND AND SUMMARY OF THE INVENTION

The invention relates to a camera useful in a stereophotogrammetric assembly which is, in turn, useful for ultimate close range stereometric measurements of objects such as, for example, of human body forms. Stereometric measurement of body forms from substantially simultaneously recorded front and rear view stereopairs has recently been developed as an effective technique for determining body and limb volume changes and related phenomena for a wide variety of purposes. In this arrangement, a three-dimensional optical model is created from the stereo photo images, which model may be displayed and measured in stereoplotting instruments. The measurements of body geometry which are read off the stereo model can be stored electrically, magnetically, or via other media in graphical or digital form. Reports detailing studies of body geometry by employing stereophotogrammetry in general include "Stereometric Measurement of Body and Limb Volume Changes During Extended Space Missions," Texas Institute for Rehabilitation and Research, Report #NAS 9-10567 dated Mar., 1971, and "Experimental Determination of Mechanical Features of Children and Adults," Texas Institute for Rehabilitation and Research, Report #DOT-HS-231-2-397, dated Feb., 1974, the disclosures of which are hereby incorporated by reference in the present specification.

In utilizing stereophotogrammetric equipment for quantitative measurement of relatively small close range objects such as the human body it is necessary that precision and accuracy be of foremost importance. The film utilized must be of high resolution so as to register fine lines of distinction, and must be held substantially perfectly flat during exposure thereof in order to obtain quantitatively accurate pictorial representations for stereoplotting. The focusing distance of the camera lenses must be finely adjustable, and the lenses must be positively guided. In order to provide for accuracy in matching up and interpreting the various pictures that are taken to produce a three-dimensional model, fiducial marks and a lens reference should be provided on the pictures themselves. Also, since film of sufficient quality for stereophotogrammetry is expensive, wastage thereof should be minimized.

The camera according to the present invention achieves all the above goals, providing a camera that produces accurate, fiducially referenced pictures with minimum film wastage. The assembly according to the present invention also provides for easy loading and unloading of film with readily releasable positive flat clamping thereof during exposure. Fiducial flash units according to the present invention are self contained within the camera eliminating the need for excessive light piping and the like.

Also, according to the present invention there are provided a number of different alternative ways of feeding film into the cameras, each of the film feeding means preventing any light from leaking into the camera housing and exposing the film.

According to the present invention, a stereometric camera is provided for use in an exemplary assembly having a pair of camera supports each having a pair of horizontal guide rails with a middle flash lamp assembly and right and left hand cameras associated therewith. One camera assembly takes a front view of the subject, and the other takes a rear view of the subject. Each camera includes a housing releasably attached to a film housing, the film housing having a handle thereon for ready handling thereof if detached from the camera housing. A lens and solenoid operated shutter assembly are associated with each camera, being mounted in a lens housing which is reciprocally adjustable with respect to the camera housing. Fine adjustment means for the lens housing are provided, and lens reciprocation is positively guided.

A flat glass plate associated with the camera housing is provided for supporting the film. It is necessary that means be provided for holding the film perfectly flat against the glass plate during exposure, and according to the present invention this is provided by a film holding plate-like member of sponge rubber or the like operatively connected to a shaft. In order to provide for ease of movement of the film holder while still providing a tight hold therewith, an overcenter toggle arrangement is provided. The toggle arrangement includes a trigger pivotally mounted to the shaft and to a lever mounted to the film housing, the trigger having a portion thereof adapted to be grasped by the operator's hand. A spring provides a biasing force for normally biasing the holding member into holding position, and the shaft is reciprocally guided by a housing bushing and a bushing through the film housing handle.

Film may be brought into operative relationship with the flat glass plate by a film magazine that is releasably attachable to the film housing. The magazine may comprise a hollow plate-like member having a piece of polyester based film 4-7 mils thick, or the like, disposed therein. A control piece extends from end of the magazine, and by reciprocation thereof one is able to move the film in and out of the open end of the magazine opposite the control piece. The magazine is releasably connected to the film housing by a pivot and by cooperating latching projections and plates on the magazine and film housing respectively.

A continuous controllably advanced film roll can be utilized in place of the magazine. The continuous feeding mechanism includes an upper reel housing having a pinch roll and metering assembly associatted therewith, and a lower reel housing having a film advancing and lost-motion indexing assembly associated therewith. Each new frame of the continuous roll of film is brought into operative position in the camera by releasing a pinch roll latch and advancing the film one rotation of the pinch roll.

A film cassette also can be provided, the cassette including top and bottom portions releasably held together by spring means and being detachable from each other — to properly position the film in the camera in front of the flat plat thereof — when inserted into the camera.

A fiducial marking assembly is provided for photographically marking the film with accurate fiducial marks during exposure thereof. The fiducial assembly comprises four orifices extending through the glass plate, one located at either side of the film held against the glass plate at the vertical midpoint thereof, and one located on top and one on the bottom of the film being held at opposite points spaced from the horizontal midpoint of the film. Light piping extends from each of these orifices to an internal flash unit which is synchronized with the flash lamp assembly, and a dial indicator driven by lens adjustments to indicate the instantaneous actual focusing distance of the lens is also in the path of the internal flash so that it is registered on the film too in a corner thereof. The lens is also located off horizontal center of the camera housing, toward the strobe assembly, the center of the lens when projected onto the glass plate providing the intersection point of lines extending from one horizontal fiducial orifice to the other and from one vertical fiducial orifice to the other. This arrangement allows for orientation of the film so that there is no wastage thereof in photographing empty space to one side of the subject.

It is the primary object of the present invention to provide improved stereophotogrammetric camera equipment and film feeding means therefor. This and other objects of the invention will become clear from an inspection of the detailed description of the invention, and from the appended claims.

BRIEF DESCRIPTION OF THE DRAWINGS

FIG. 13 is a detail view taken along lines 13—13 of FIG. 10 showing an exemplary indexing-latching arrangement for use with the upper reel housing of FIG. 11; and FIG. 14 is a front view of the leader portion of reel film utilizable with the camera of FIG. 10.

DETAILED DESCRIPTION OF THE INVENTION

Figure 1:
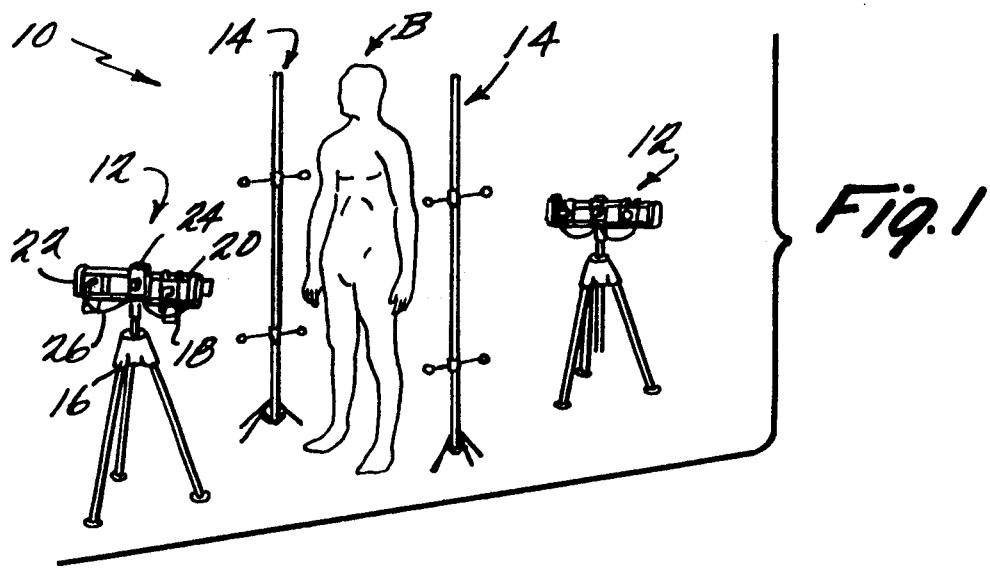
FIG. 1 is a perspective view of an exemplary stereometric camera system using stereometric camera according to the present invention.

An exemplary stereometric camera assembly for measurement of body and limb volumes and the like according to the present invention is shown generally at 10 in FIG. 1. The assembly 10 generally includes a pair of camera assemblies 12, and a pair of control stands 14, which control stands provide a datum or reference plane which is common to both front and rear view camera assemblies 12. This permits the location of points over an individual's entire body surface with a single coordinate system, as well as providing known distances for calibration purposes, as more fully explained in the reports incorporated by reference herein. Each camera assembly 12 comprises a tripod stand 16 or the like, a pair of horizontally extending guide rails 18, a right hand camera 20 mounted for reciprocal movement on rails 18, a left hand camera 22 mounted for reciprocal movement on rails 18, and a flash lamp assembly 24 mounted between the camera 20, 22, and stationary with respect to the stand 16. The flash lamp assembly 24 preferably includes a "surface contrast projector" therewith for projecting a random high contrast "texture" onto the body surface. Such a device is especially useful when the subject is a light-skinned individual. Connectors 26 lead from the flash lamp assembly 24 to both cameras 20, 22, to provide for coordinated operation of all three devices 20, 22, and 24.

Figure 2:
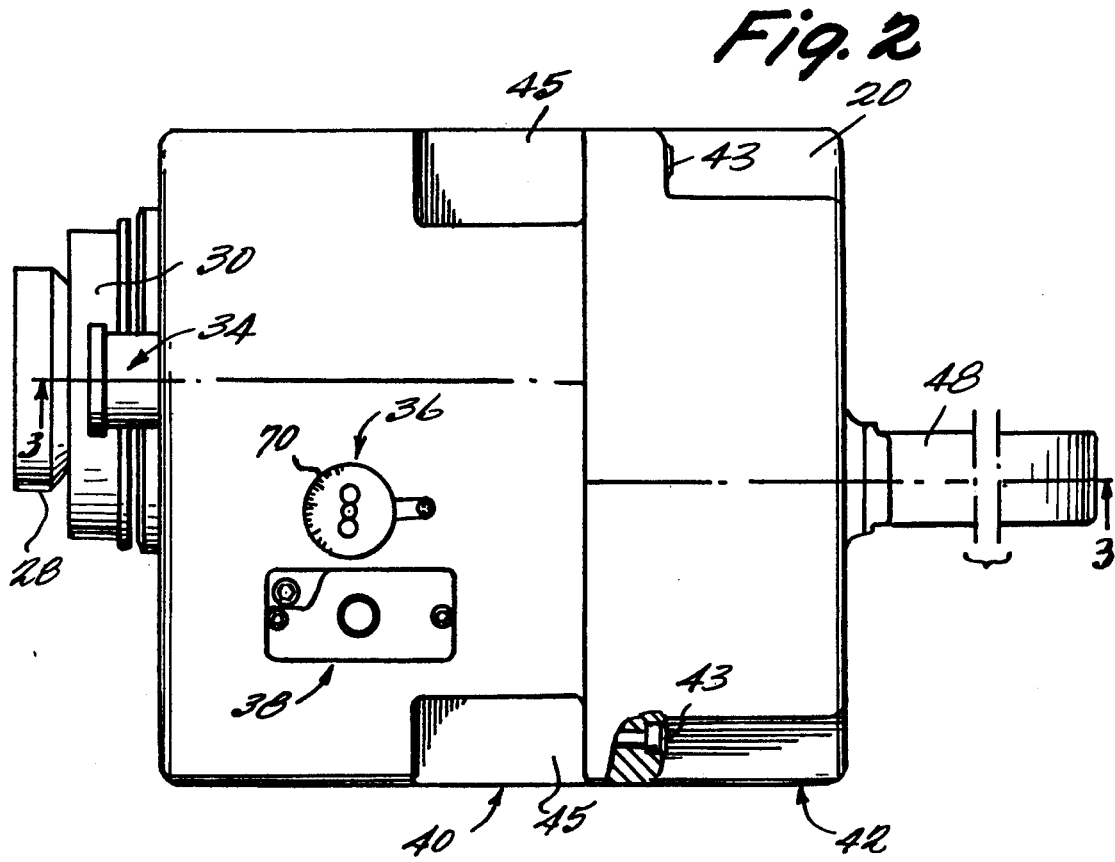
FIG. 2 is a top plan view of one of the individual cameras of the system shown in FIG. 1.
Figure 4A:
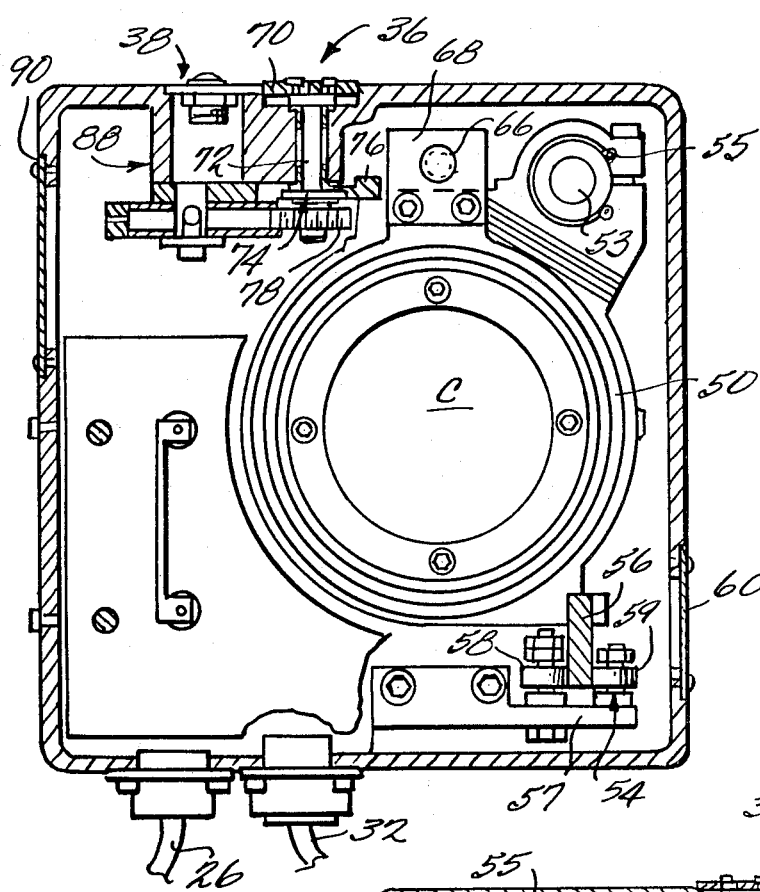
FIGS. 4a and 4b are cross-sectional views taken along lines 4—4 of FIG. 2 of the right-hand and left-hand cameras respectively of the camera system of FIG. 1.
Figure 4B:
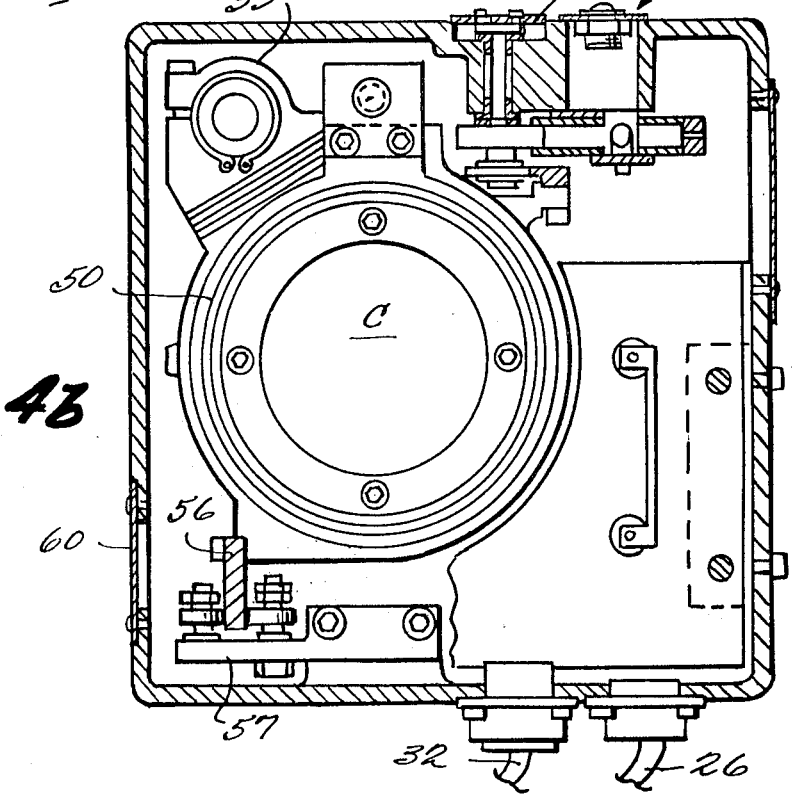

Each camera 20, 22 according to the present invention includes a lens 28 (see FIG. 2 in particular), a shutter assembly 30, a camera housing portion 40, and a film housing portion 42. The lens 28 may be of any suitable type, but preferably comprises one having an effective focal length of 90 mm, such as Ser. No. 902999 manufactured by Fuji Photo Optical Co. The lens is located off horizontal center, toward the flash lamp assembly 24, of the housing 40 in order to minimize the film wastage in photographing the area outside the stands 14. Each shutter assembly 30 is preferably of the solenoid operated type, controls 32 (see FIG. 4a, 4b) therefor leading from assembly 30 through connector 26 to flash lamp assembly 24 for coordinated operation therewith. An ILEX Synchro Electronic shutter assembly has been found to be appropriate.

Associated with camera housing 40 is an adjustment assembly 34 for adjustment of the lens focusing distance and an indicator assembly 36 driven thereby for externally indicating the fine current focal adjustment of the lens. A cover plate and lens 38 is also provided to produce an external visual indication of operation of the internal flash, as will be more fully described below. A set of guide collars 45 are mounted on housing 40 for receipt of rails 18 to provide for guided horizontal reciprocation of the cameras 20, 22; a lock screw 46 (see FIG. 3) or the like may be associated with one or more of the collars 45 if desired. The housing 40, 42 is releasably connected together in any suitable manner, such as by a plurality of screws 43. A handle 48 or the like is mounted on housing 42 to provide for easy removal of housing 42 from connection with housing 40 after release of screws 43.

A lens housing 50 (see FIG. 3) is provided for mounting of the lens 28 and shutter assembly 30 for movement with respect to the camera housing 40. The lens housing 50 is received within an opening 51 in the front of the camera housing 40, and a light seal 52 such as felt is provided therebetween to prevent the entry of light or foreign material into the housing 40 through opening 51. The housing 50 is guided in its reciprocal movement by a guide rod 53 (see FIG. 4a) or the like mounted near the top of housing 40, and a guide roller assembly 54 mounted adjacent the bottom of housing 40. A pair of collars 55 affixed to housing 50 receive guide rod 53 therein, and a guide plate 56 affixed to housing 50 is received by the roller assembly 54. As shown most clearly in FIGS. 4a and 4b, the roller assembly 54 may include a roller support plate 57 attached to the bottom of housing 40 which supports rollers 58, 59 thereon for rotation about vertical axes. The rollers 58, 59 receive plate 56 therebetween.

Adjustment means 34 is provided for reciprocating housing 50, as guided by means 53, 54, for adjusting the focal plane of the lens 28 dependent upon the distance the subject is from the camera 20, 22. The adjustment means 34 (see FIG. 3) includes a dial 62 connected to a shaft 64, which shaft is rotatable in bushing 65. The exterior surface 63 of dial 62 has markings thereon which may cooperate with a stationary marking on housing 40 to indicate the relative position of the dial 62. Forming a part of shaft 64 is a screw drive portion 66. The screw drive portion 66 cooperates with nut 68 affixed to housing 50. As screw 66 rotates, the rotational movement thereof is transformed into reciprocal movement of the housing 50 by the interengagement of portion 66 and nut 68.

Figure 5:
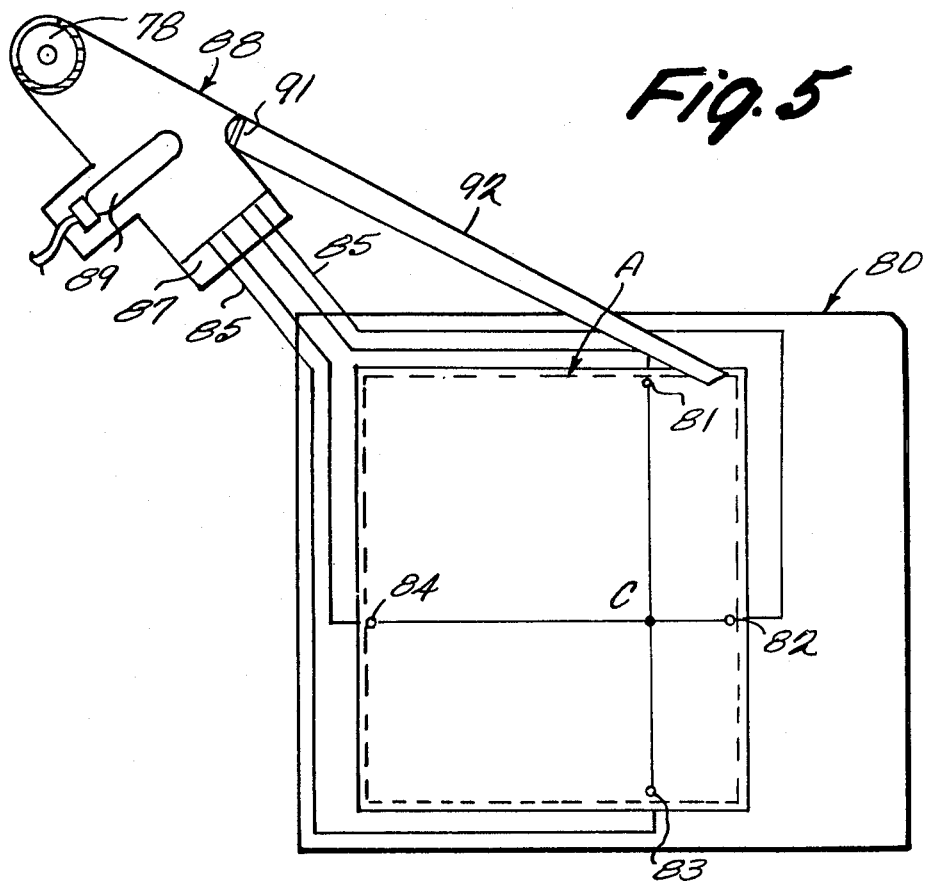
FIG. 5 is a schematic showing of the internal flash and light piping assembly of the camera of FIG. 2.

The indicator means 36 (see FIGS. 4a and 4b) located on top of the camera includes a dial 70, shaft 72, gear member 74, and rack 76. The dial 70 preferably has markings on the exterior thereof for cooperation with markings on the top of housing 40 to provide for indication of the position of the lens 28 relative thereto. Rotation of dial 70 is caused by rotation of shaft 72 connected thereto, and in turn by rotation of gear or pinion member 74 connected to shaft 72. Pinion member 74 rotates due to reciprocation of rack 76 in operative engagement therewith, rack 76 being rigidly attached to the movable lens housing. Also provided on shaft 72 is an internal indicator 78 which has markings thereon indicating the relative position of the lens 28. Via optical apparatus 88 (see FIG. 5) the reading of indicator 78 is projected toward and recorded directly upon the film when internal flash 89 is activated which as previously explained, also simultaneously causes the fiducial marks to be photographed via light pipes 85.

Figure 3:
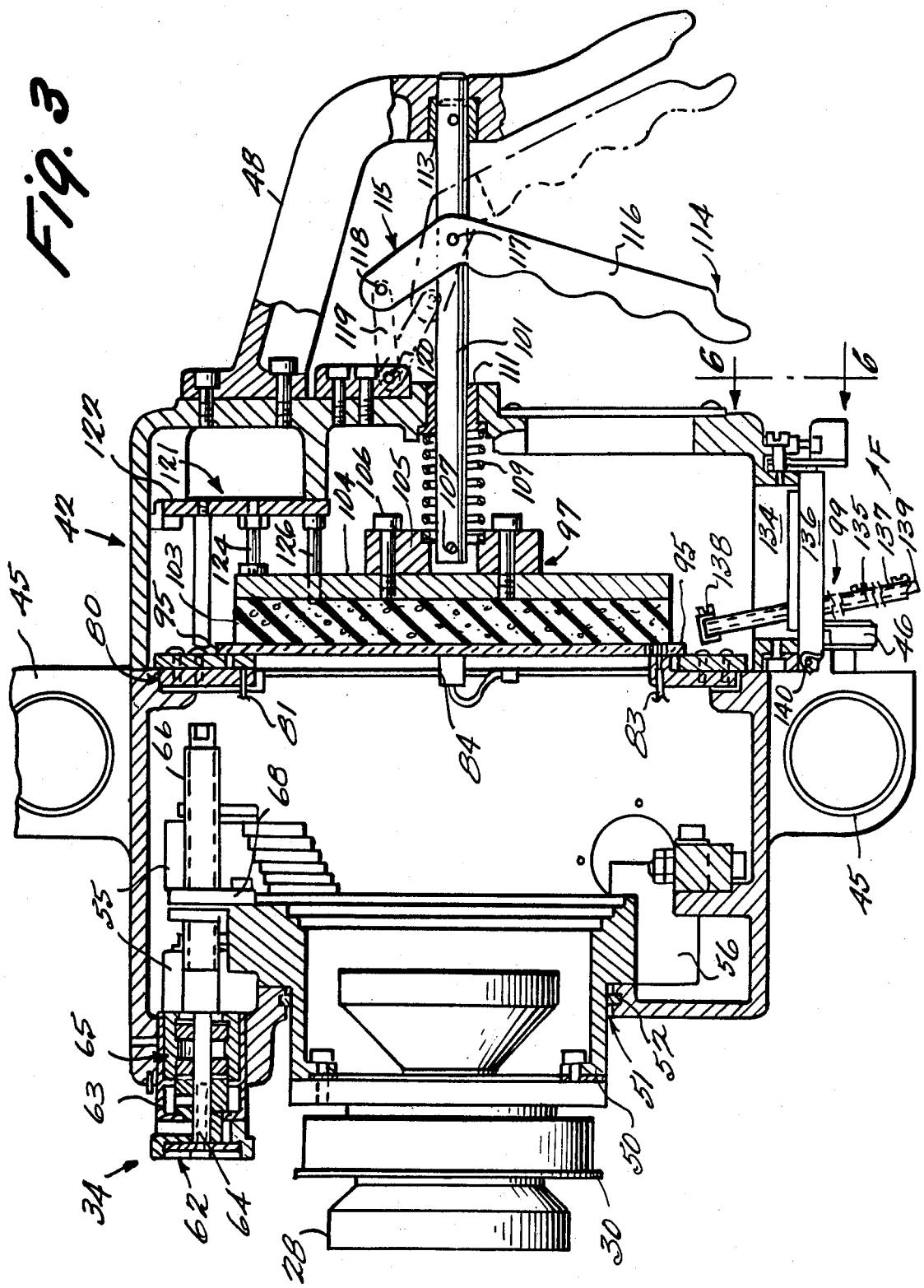
FIG. 3 is a cross-sectional view, with some parts in elevation of the camera of FIG. 2 taken along lines 3—3 of FIG. 2.
Figure 7:
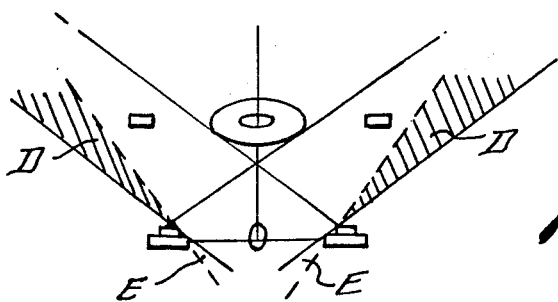
FIG. 7 is a schematic view of an assembly according to the present invention taking a picture of a subject, with viewing area thereof accented.

In order to provide assistance in reconstructing the camera geometry for stereoplotting purposes, and to support the film during exposure, a plate assembly 80 is provided, which cooperates with apparatus 88. The means 80, 88 acting togethr provide for the recordation of particular fiducial reference points on the film, as well as the indicator 78 marking, which provides for reduced effort and increased accuracy during subsequent stereoplotting. As seen most clearly in FIGS. 3 and 5, the fiducial plate assembly generally comprises a plate member having four light pipe orifices 81, 82, 83 and 84 passing therethrough. The light pipe orificies also pass through a glass plate 95 disposed on the plate assembly 80, and have a point of registry on a film pressed against the plate 95 (shown at 137 in FIG. 3, shown in dotted line at A in FIG. 5). Each light pipe orifice 81, 82, 83, 84 is connected to a light pipe 85, each pipe 85 preferably may be Dupont Crofon light piping, isolated from the surrounding internal camera environment by black spaghetti. The light pipe orifices 82 and 84 are disposed at the vertical midpoint of a film frame disposed on glass 95, while the light pipe orifices 81 and 83 are not disposed at the horizontal midpoint of a film frame A, but rather are disposed off center with respect thereto. The intersection of lines extending between 81 and 83 and 82 and 84 is at point C, which is the centerpoint of lens 28 (see FIGS. 4a and 4b), which as mentioned above is off horizontal center of housing 40. This particular arrangement of the film frame A with respect to plate assembly 80 and lens 28, and the location of the point C by the light pipes, allows a minimum amount of film to be utilized for photographing a given subject. As shown diagrammatically in FIG. 7, each of the cameras 20 and 22 would record the image of portion D outside stand 14 that is wasted, no subject being therein, if film were provided behind the lenses 28 in a conventional manner. With the arrangement according to the present invention, no film is disposed in the interior portion E of the cameras that correspond to the portion D; indeed there is no complete interior portion E.

Recordation of fiducial marks by pipe orifices 81, 82, 83, and 84 on a film frame A, which allow determination of the center C of the lens 28 during stereoplotting is provided by the cooperation of apparatus 88 with the pipe orifices 81, 82, 83 and 84. Extending from each point 81, 82, 83, 84 about the light pipes 85 to a terminal portion 87, as mentioned above, is a piece of isolating surrounding "black spaghetti". Mounted within apparatus 88 for providing light for the light pipes 85 is an internal flash, or lamp 89 which may be properly pulsed Lee Craft 6v, 0.075 amp. lamp. When the flash lamp assembly 24 for a camera assembly 12 is actuated, the internal light flash 89 for each camera 20, 22 is also activated, which results in light travelling through pipes 85 and being recorded at points 81, 82, 83, and 84 on a film frame A, and which results in light being reflected off indicator 78, through lens 91 and piping 92, to a corner of film frame A, whereby the focusing distance of lens 28 is recorded on the film along with the fiducial marks. The lens 38 located on the top of housing 40 provides an external visual indication that the internal lamp 89 has flashed.

As seen most clearly in FIG. 3, the plate assembly 80 and glass plate 95 associated therewith are attached to camera housing 40. The plate 95 must be a substantially flat plate to insure that resulting pictures have the necessary accuracy for stereoplotting purposes. A means must also be provided for tightly holding a film frame A against the flat plate 95 to insure accuracy, and means must be provided for accurately and positively feeding the special film necessary into operative relationship with plate 95. Such holding and feeding means are shown generally at 97 and 99 in FIG. 3.

The film frame holding means 97 preferably comprises a reciprocal shaft 101 having a holding member 103 operatively attached to one end thereof inside the film housing 42. The holding member 103 preferably comprises a plate-like portion of resilient material such as open or closed cell sponge rubber for engaging the film frame and for insuring that the film frame is disposed as flatly as possible against flat glass plate 95. Apparatus for operatively attaching the member 103 to shaft 101 may include a backup plate 104 of generally rigid material for member 103, a mounting ring 105 attached to plate 104 with bolts 106 or the like, and a roll pin 107 attaching shaft 101 to ring 105 in a manner allowing relative pivotal movement therebetween. The ring 105, and shaft 101 connected thereto, is preferably spring biased by coil spring 109 or the like to the position shown in FIG. 3 - that is the position wherein member 103 holds a piece of film tightly against plate 95. The shaft 101 is horizontally reciprocal, being guided in bushing 111 in housing 42, and bushing 113 in handle member 48.

In order to provide for quick positive movement of the shaft 101 with respect to the housing 42, and for latching of the shaft 101 in the position to which it is moved, an overcenter toggle assembly 115 or the like may be provided. The assembly 115 includes a trigger 116 having a hand grip portion 114 at one end thereof, and being pivotally connected at the other end thereof to a lever 119, as by a pivot pin 118, and being pivotally connected to shaft 101 as by pivot pin 117, located at a point therealong intermediate its ends. The lever 119 is connected at the end thereof opposite the pivot pin 118 to the housing 42, as by pivot pin 120. The assembly 115 is clearly a toggle assembly which latches at either position overcenter — that is in the positions shown in full line and dotted line in FIG. 3. When the trigger 116 is moved to the dotted line position against the bias of spring 109, the member 103 is moved away from the plate 95, and a film frame disposed therebetween is released.

A means 121 is provided above film frame holding means 97 for cooperation therewith in providing positive frictional engagement of film fed thereto. The means 121 generally comprises a stationary plate 122 having a pair of spaced adjustable shafts 124 associated therewith. Adjustment of each of the shafts 124 is provided so that there is only a small clearance between the plate 104 and the shafts 124 when the means 97 is in the film latching position shown in FIG. 3 (i.e., 0.010 inches with 4-7 mil thick film). When the means 97 is released from latching position, shafts 124 bear against plate 104, and prevent movement thereof more than the above-mentioned clearance (i.e., 0.010 inches). The lower portion of plate 104 will thus pivot about pivot pin 107 when moving to the unlocking position. Guide rods 126 cooperating with the edges of holding member 103 may be provided to prevent anything but longitudinal and pivotal movement of the plate 104. The provision of shafts 124 thus allows a small frictional force to be continuously applied to the top of a piece of film A located within housing 42 so that it will not fall downwardly when released without a slight "tug" applied thereto, and so that positive holding thereof during film loading is provided.

Figure 6:
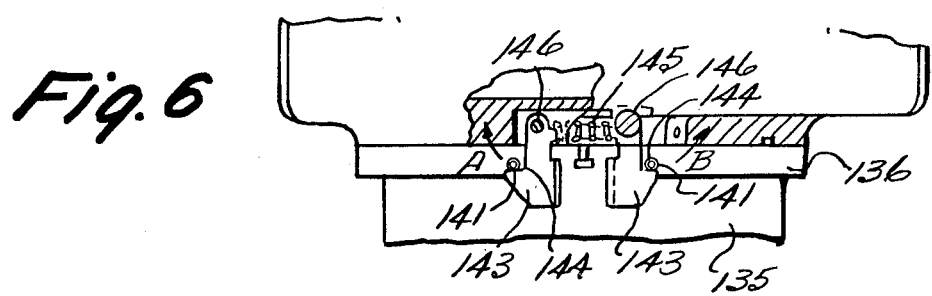
FIG. 6 is partly cross-sectional and partly elevational view of the camera of FIG. 3 taken along lines 6—6 of FIG. 3.

Means 99 are provided for allowing ready placement of a special piece of film in proper location adjacent plate 95, and for ready removal and replacement of the film with a minimum chance of extraneous light ruining the film. A film that has been found most suitable for use with cameras 20, 22 according to the present invention is a stable polyester base film 4-7 mils thick known as DuPont Cronar or Kodak Estar. Such film provides positive accurate images, and may be pressed very flatly against the glass plate 95. A means 99 for inserting and removing the film (137) into the film housing 42 preferably includes a magazine portion 135 and a positioning portion 136. The magazine 135 comprises a rectangular hollow member having a film frame 137 disposed therein. Open end 138 of magazine 135 cooperates with opening 134 in the bottom of housing 42. The film frame is connected at the end thereof opposite the open end 138 of magazine 135 to a slide member 139. By reciprocating the slide member 139 generally vertically in the plane of the magazine 139 generally vertically in the plane of the magazine 135, the film 137 may be moved into operative engagement with the plate 95, and removed from engagement therewith. The positioning portion 136 of assembly 99 (see FIGS. 3 and 6 especially) is releasably pivotally connected at 140 to the housing 42 at one end thereof, and has latching projections 141 or the like formed at the other end thereof. When end 140 is in pivotal engagement with the housing 42 and the assembly 99 is pivoted upwardly in direction F, projections 141 cam latch plates 143 out of their way against the bias of springs 145, and are then held by surfaces 144 of plates 143 in the position shown in FIG. 3, wherein the magazine 135 is in proper position for film 137 to be moved into and out of housing 42, and wherein the bottom opening 134 of housing 42 is closed off so tht no light may enter therethrough. To release the means 99 from latched engagement with plates 143, it is necessary only to pivot the plates 143 against the bias of springs 145 about pivots 146 until surfaces 144 no longer block projections 141.

While a particular film dispensing means 99 for dispensing an individual film frame 137 has been described above, other film dispensing means could be provided. For instance, a roll of film could be mounted on the top of the housing 42, and a take-up roll mounted on the bottom thereof, and the film could be moved by any suitable manual or automatic means. A film holding means 97 or the like would still have to be provided, of course, and the means 97 disclosed in the drawings would be suitable for this purpose.

Apparatus according to the present invention now having been described, a typical operation thereof for stereophotogrammetric measurement will now be set forth. A subject B is placed between the stands 14, and the camera assemblies 12 are placed to the front and the rear thereof. The cameras are adjusted so that the height of the cameras is at the midpoint of the subject, and the cameras are horizontally adjusted so as to include the subject and the control stands 14, but so that as little extraneous area D as possible is photographed. The cameras are disposed the same distance from the subject, and are focused to provide sufficient depth of field to include both the nearest surface of the subject and the control tapes in the zone of sharp focus. Adjustment of the focusing distance of the lens 28 of each camera is provided by adjustment means 34.

Once the camera assemblies are properly adjusted, the cameras are loaded with film. This is accomplished by (1) moving the trigger 116 of each camera toward handle 48 (see dotted line position in FIG. 3), which moves the holding member 103 away from the glass plate 95, (2) attaching the film assembly 99 to the film housing 42 by latching projections 141 with latch plates 143, (3) moving the film 137 into engagement with plate 95 by pushing upwardly on member 139, and (4) clamping the film 137 into engagement with the plte 95 by moving trigger 116 back over center under the influence of spring 109 to the solid line position in FIG. 3. The pictures are then snapped by activation of the synchronized shutters of the cameras which via their X-synchronization electrical switches, in turn activate the internal flashes and the central flash lamp assemblies 24. It is preferred that the assemblies 24 are interconnected and so timed that one flashes only a few milliseconds or so after the other so that there is no interference on one side with the opposite side's flash, but so tht the subject does not have time to move. Internal lights 89 of each camera 20, 22 will be actuated at substantially the same time as the respective assemblies 24 and solenoid operated shutters 30, and simultaneous recordation of reference marks and indicator 78 setting will thus be provided on the film by the apparatus 88 and light pipe junctions 81–84.

After the pictures are taken, the exposed film 137 is removed by release of holding assembly 97 and withdrawal of the film 137 into the magazine 135, and by subsequent release of latch plates 143. Once the pictures are developed, stereoplotting is pursued in conventional manners such as, for example, that described in the aforementioned incorporated reports "Experimental Determination of Mechanical Features of Children and Adults" and "Stereometric Measurement of Body and Limb Volume Changes During Extended Space Missions".

Figure 8:
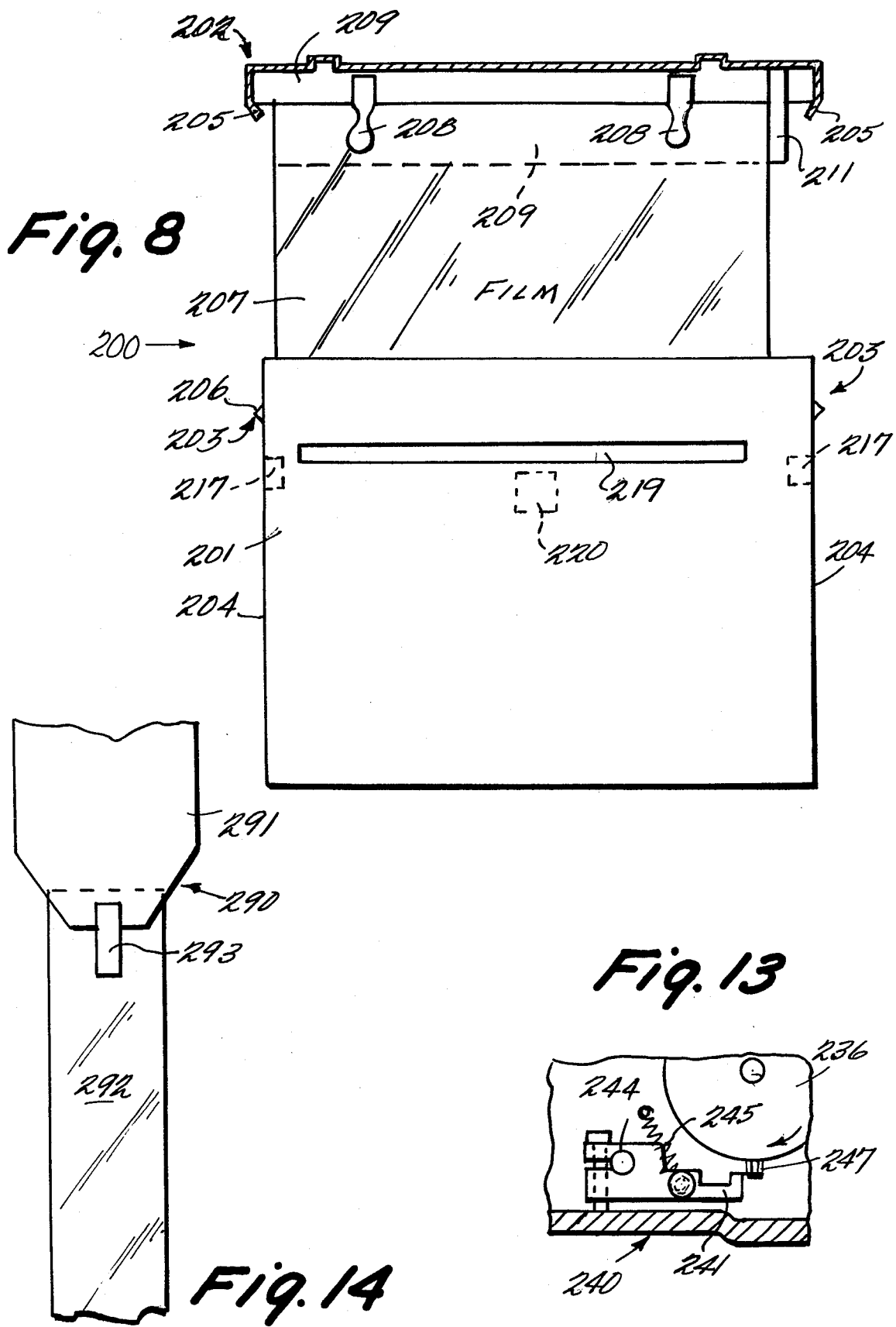
FIG. 8 is an exploded view of an exemplary film cassette that may be used for a modified camera according to the present invention.

A film cassette 200, such as shown in FIG. 8, (made of 1/16 inch black KYDEX or the like), may be utilized as the film positioning means according to the present invention instead of the film frame assembly shown in FIG. 3. The film cassette 200 includes an elongated narrow cassette body portion 201 for cooperating with a top, film holding portion 202. The body 201 has latch-receiving projections 203 formed on the narrow side faces 204 thereof, which projections 203 cooperate with spring-latches 205 formed on the top 202. When the top 202 is moved toward the body 201 for engagement therewith, the spring latches 205 are cammed outwardly by the projection 203 slanted top faces until the peak 206 of each projection is passed, and then the latches 205 move downwardly and inwardly and engage the bottom sloped portions of the projections 203 with a holding force. While the holding force provided by latches 205 and projections 203 is sufficient to prevent inadvertent detachment thereof, it is small enough that the body 201 and top 202 may readily be pulled apart by exerting a strong force pulling them relative to each other.

Instead of providing the spring latches 205 and the projections 206, a friction fit may be provided between the top and the body 201. If the friction fit is tight enough, it will function in the same manner as the latches 205 and projections 206 to hold the members 201 and 202 together, and to provide release thereof, at the appropriate instances.

A piece of film 207 is attached to the top 202 by a plurality of clips 208 formed on center portion 209 extending downwardly from top 202. The spring clips 208 may be formed of beryllium copper, and they clamp the film 207 to the center portion 209. A film stop and locator 211 is provided associated with center portion 209. The cassette body portion 201 is hollow and adapted to receive the film 207 therein, and the film 207 may be moved out of and back into the body 201.

Figure 9:
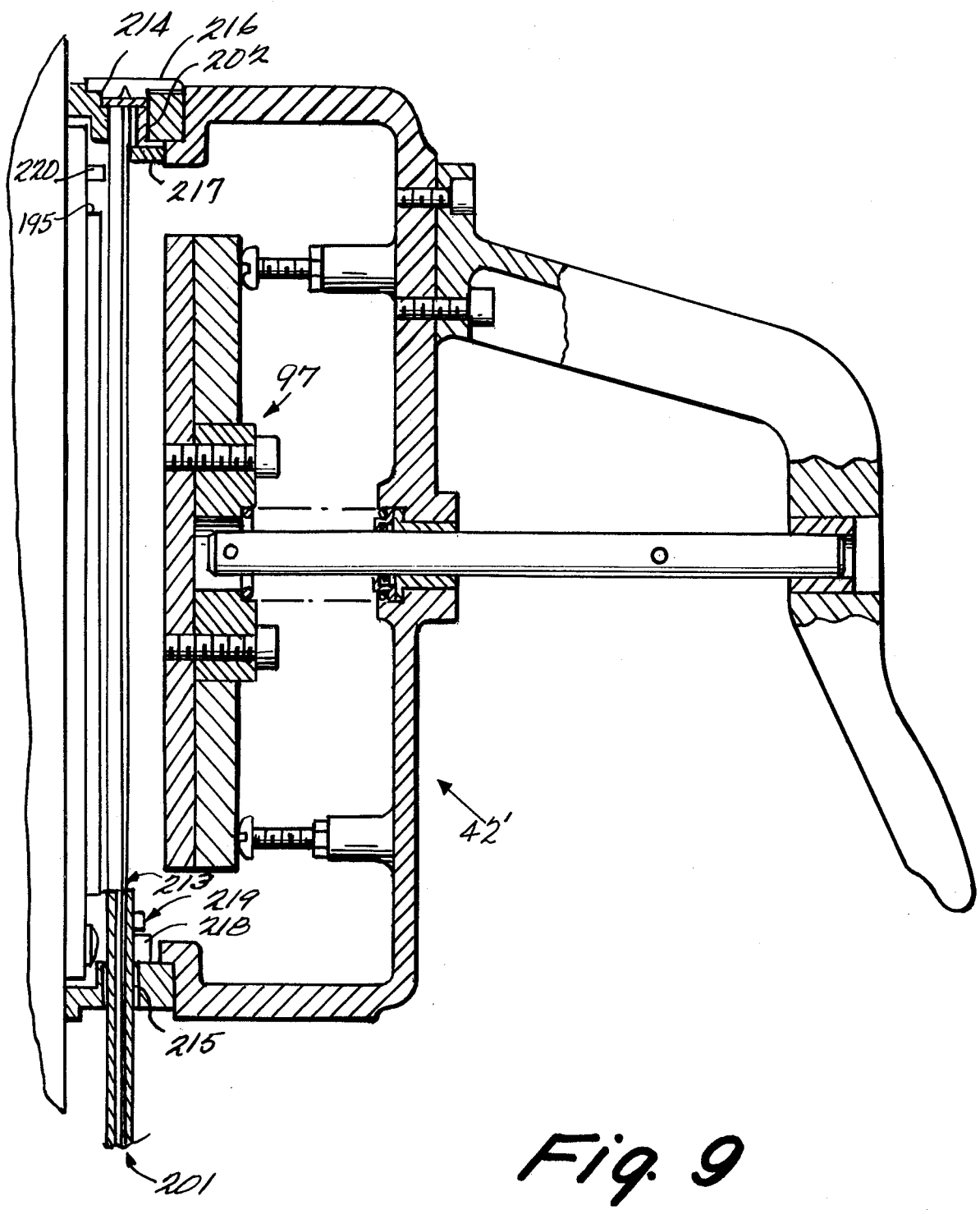
FIG. 9 is a sectional side view of a modified camera according to the present invention utilizing the film cassette of FIG. 8.

The film housing 42′ shown in FIG. 9 is adapted to utilize the film cassette of FIG. 8 therein, the film housing 42′ being substantially the same as the film housing shown in FIG. 3 except that provision is made for receipt of the cassette 200 instead of the film frame feeding means 97, and no abutment 124 is provided for the top part of the holding means 97 to prevent movement thereof away from the plate 95. The film housing 42′ includes a through-extending vertical passageway 213 of substantially the same size as the cassette body 201, and having light-sealing portions (i.e., felt seals 214, 215) at the extremities thereof. The seal 214 is adapted to engage the top 202 of the cassette 200 to provide a light-sealing relationship therewith, while the seal 215 engages the body 201 of the cassette 200, and provides light-sealing engagement therewith. Preferably a torsion spring-loaded flap 216 is provided on the top of the camera covering the top extremity of the passageway 213.

Locating abutments 217, 218 are provided in the film housing 42′ adjacent the extremities of the passageway 213 for providing proper positioning of the film 207 of the cassette 200 in the passageway 213 for use with the film frame holding means 97. An abutment 217 (located adjacent either end of passageway 213) engages the bottom of the top portion 202 of the cassette 200 to limit the penetration thereof into the passageway 213 the desired distance for aligning the photographic portion of film 207 with the holding means 97, and the abutment 218 is adapted to engage abutment 219 (see FIG. 9) of the cassette body 201 to prevent the body 201 from falling out of the passageway 213, and for preventing the film 207 from being entirely displaced from the body portion 201 so that reinsertion thereof is required.

Abutment 220 in film housing 42′ prevents the separation of the top 202 and the body 201 and prevents withdrawal of the cassette body 201 from the film housing 42′ if the cassette body 201 is inserted into the film housing 42′ with the wrong orientation (so that the abutment 219 is located "in front" instead of "in the rear").

Utilization of the cassette 200 in the film housing 42′ of FIG. 9 may be as follows: The film holding means 97 is moved to the position shown in FIG. 9, spaced from the plate 95, the flap 216 is opened, and the cassette 200 is inserted into the passageway 213, sliding past the flap 216. The cassette 200 is pushed into passageway 213 until the top 202 abuts the abutment 217, at this point light seals being provided at 214 and 215 and the cassette body 201 having a portion thereof extending out the bottom of passageway 213. The flap 216 is then closed, and the cassette body 201 is pulled downwardly out of the passageway 213, the clamping engagement between the springs 205 and projections 203 being overcome since the top 202 is held in place by abutment 217. The body 201 is withdrawn from the passageway 213 until the abutment 219 engages abutment 218 of the film housing 42′. At this time, the film holding means 97 may be moved into holding engagement with the film 207, and a picture is ready to be taken. Once the picture is taken, the above procedure is reversed, and the closed cassette 200 withdrawn from the film housing 42′.

Figure 10:
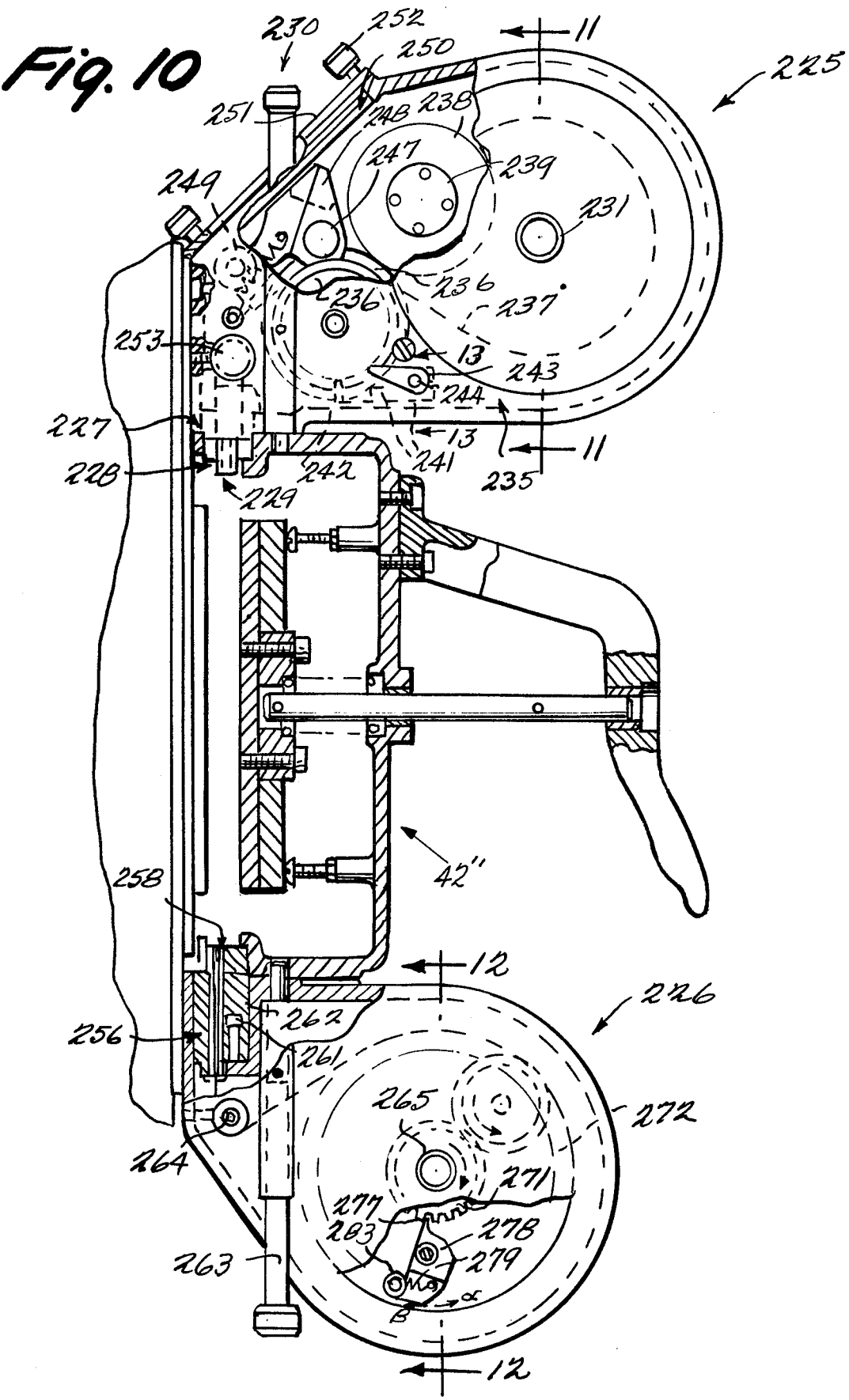
FIG. 10 is a sectional side view of a modified camera according to the present invention utilizing reel film.

When it is desired to take a plurality of pictures in succession without the need for continuously inserting and withdrawing film cassettes, feeding means or the like, the reel arrangement illustrated in FIG. 10 may be employed as the film positioning means. The film housing 42″ in FIG. 10 is substantially the same as the film housing 42 except that no abutment 124 is provided for the top part of the holding means 97 to prevent movement thereof away from the plate 95, and instead of the frame feeding means 99 being utilized, the upper reel assembly 225 and the lower reel assembly 226 are utilized.

The film housing 42″ includes an upper opening 227 thereof for receipt of a male sealing portion 228 of the upper reel housing 225. The opening 227 is plush lined with light sealing material (felt or the like) which engages the periphery of male portion 228 and forms a light seal therewith. The male portion 228 has a plush-lined passageway 229 therethrough which makes a light sealing engagement with the continuous film from the reel in upper housing 225, the passageway 229 being of generally the same width and thickness as the film adapted to pass therethrough. The upper reel housing 225 is mounted to the film housing 42″ by a bolt 230 or the like passing through the housing 225 and threadedly engaging an opening in the top of the film housing 42″. The housing 225 is attached to the film housing 42″ by inserting the male portion 228 into the opening 227, and then threading the bolt 230 into the camera housing.

Figure 11:
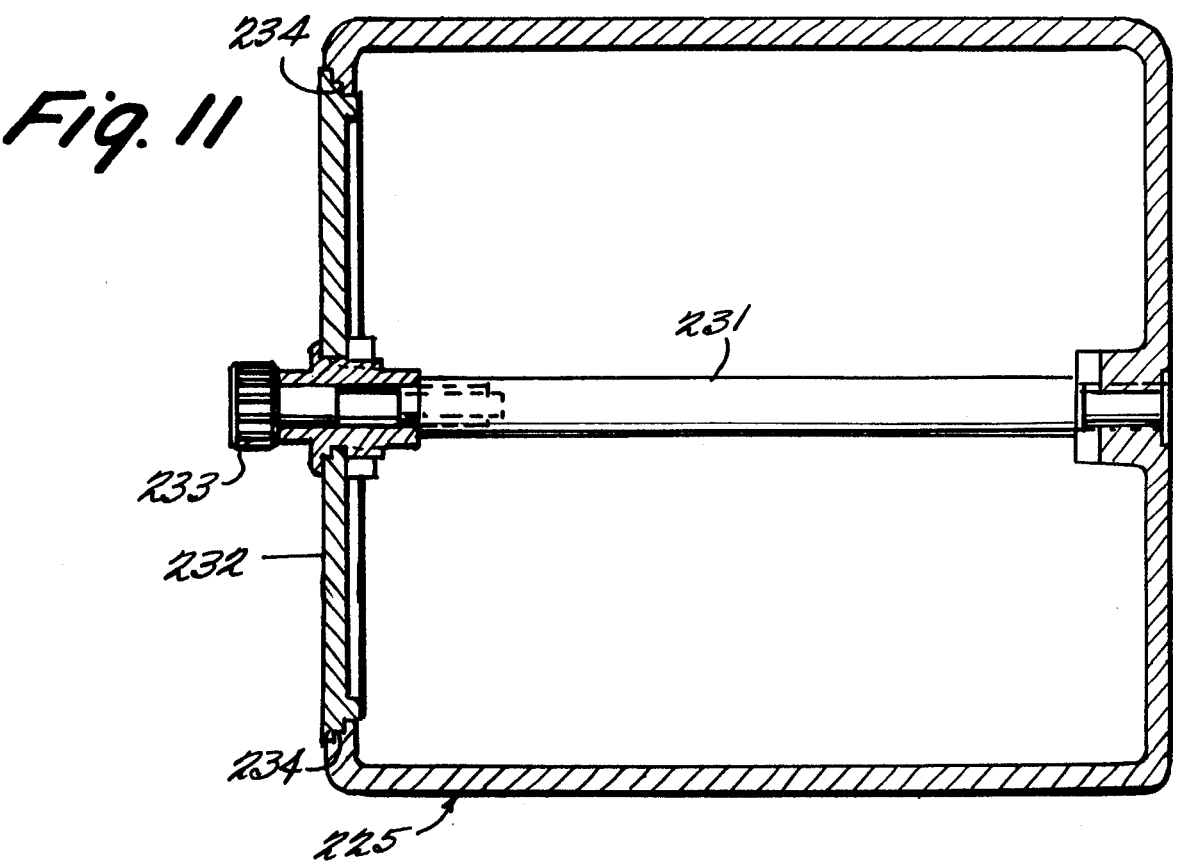
FIG. 11 is a sectional view taken along lines 11—11 of FIG. 10 showing an exemplary upper reel housing of the camera of FIG. 10.

The upper housing 225 has a film reel mounting shaft 231 (see FIG. 11) passing therethrough, which shaft 231 has a removable cover 232 cooperating therewith for allowing insertion of a new film reel into the housing. As shown in FIG. 11, the removable cover 232 has a screw 233 associated therewith which is threadably engageable with an opening in the shaft 231, and the periphery 234 of the cover 232 makes a sealing engagement with the housing 225. By unscrewing screw 233 and removing cover 232, access is gained to the inside of housing 225, and a new reel of film can be slipped over the shaft 231 after the old reel is removed.

The upper housing 225 contains a pinch roll assembly 235 for guiding the film from the reel into proper relationship with the film holding means 97 of film housing 42″, for metering the correct amount of film for each exposure, and for providing proper film tension. The assembly 235 includes a first roller 236 having the circumference thereof covered with 50 durometer conductive neoprene rubber or the like (to prevent static), and having indicating means and metering means associated therewith. The film consumption indicating means includes a rotatable gear 237 mounted on one end face (the inwardmost face looking in at FIG. 10) of roller 236, which engages a similar gear member 238 mounted inside of the housing on the side of the housing (the farthest side looking in at FIG. 10) for rotating the member 238 in response to rotation thereof. The member 238 has a graduated indicia wheel or disc attached thereto, which disc (shown at 239 in FIG. 10) is on the outside of the housing 225 and cooperates with a stationary mark on the housing. The number of teeth of the gear member 237, and the gear ratio between the members 237 and 238, are so selected that the wheel attached to member 238 will move one graduation each time the first roller 236 is rotated once, and the number of graduations on the wheel generally corresponds to the number of frames of film on the film reel within the housing 225 (i.e., the gear member 237 may have X (250) teeth, and gear member 238, X + 1 (251) teeth, wherein X is an integer greater than 1.

The metering assembly associated with first roller 236 is shown generally at 240 in FIGS. 10 and 13 and includes an abutment arm 241 adapted to cooperate with an abutment 242 extending radially from the periphery of the roller 236, the abutment 242 located close to the side of the housing 225 and not interfering with the film disposed on the periphery of the roller 236. The diameter of the roller 236 corresponds to the length of one film frame from the reel of continuous film disposed in housing 225, so that each time one film frame is fed past the roller 236, the roller 236 rotates once, and comes from a position wherein abutment 242 thereof is adjacent to abutment arm 241 back to a position where abutment 242 abuts the arm 241. This provides a clear indication to the operator that the film has advanced one film frame. The roller 236 will be retained in the position to which it is advanced in abutment with arm 241 until it is desired to advance the film another frame, at which time the arm 241 is released by pivoting lever 243 located exteriorly of housing 225, which lever 243 is mounted on a common shaft 244 with the abutment 241 and pivots the abutment 241 of our interfering position with the abutment 242. Once the roller 236 is rotated so that the abutment 242 clears the abutment 241, the lever 243 is released, and the spring 245 will return the arm 241 back to the position shown in FIG. 13 in potential blocking engagement with the abutment 242 of roller 236.

A second roller 247 of the pinch roll assembly 235 cooperates with the first roller 236 to provide for proper feeding and tension of the film, the roller 247 being a spring-biased steel roller mounted on an overcenter mechanism or the like. The roller 247 extends between a pair of pivoted plates 248 (one of which is shown in FIG. 10) joined together in an integral casting, each of which are normal to the axis of roller 247, one or both of the plates 248 having a coil spring 249 or the like extending therefrom to the housing 225. Access to this overcenter lever arrangement is provided by an opening 250 in the housing 225, which opening 250 is covered by a removable cover 251. By unscrewing holding screws 252, the cover 251 may be removed, and one may pivot the plates 248 so that the second roller 247 moves away from the first roller 236 to a position wherein it is held by the spring 249 (an overcenter position of plates 248) out of engagement with the roller 236. The roller 247 is moved out of engagement with the roller 236 during threading of the film through the assembly 235, and once the film is threaded over the roller 236, the roller 247 is moved back to a position wherein the film is pinched between the rollers 236, 247. After passing between the rollers 236, 247, which provide tensioning of the film as it passes through the film housing 42″, as well as guiding the film and metering it, the film passes over a third steel idler roller 253, and then through the plush-lined opening 229 in the male member 228 and into the film housing 42″.

Communication between the lower housing 226 and the film housing 42″ is provided by a passageway-defining member 256 associated with the film housing 42″ and the housing 226. The opening 258 is plush-lined to provide a light seal when cassette 200 is used and to prevent film scratching when used by such. The opening 260 has disposed therein the member 256, connected to the housing 226 by a screw 261 or the like. The member 256 has a plush-lined passageway 262 therethrough for providing a light seal. The housing 226 is attached to the film housing 42″ by a bolt 263 or the like, the bolt 263 being threadedly received in an opening in the bottom of the housing of film housing 42″.

Figure 12:
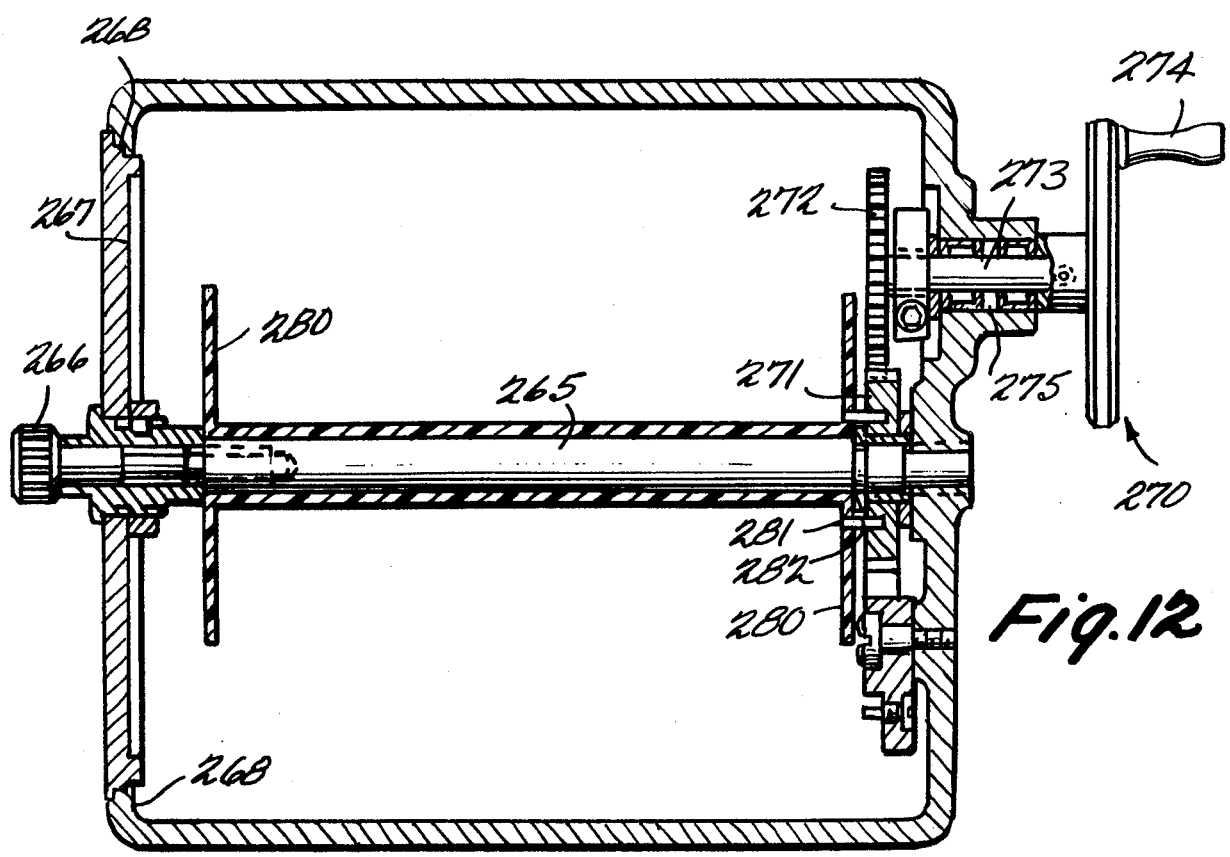
FIG. 12 is a sectional side view taken along lines 12—12 of FIG. 10 showing an exemplary lower reel housing of the camera of FIG. 10.

Film passes through the passageway 262 around a steel idler roller 264 and then onto a conventional reel (shown in dotted line at 280 in FIG. 12) mounted on a non-rotatable shaft 265 in housing 226, the reel 280 being substantially the same as the reel provided in the upper housing 225. The reel 280 has openings 281 formed in one face thereof that are adapted to receive projections 282 extending from the face of gear 271 which projections serve to rotate the reel 280 when the gear 271 is rotated to drive the reel and take up film. The cover 267 abuts the housing 226 at the periphery 268 and as the cover 267 is moved away from the housing 226, access to the shaft 265 is provided for removing an old reel 280 from the shaft 265, and placing a new reel thereon.

A film advancing mechanism 270 is associated with the shaft 265 for rotating the reel 280 and taking up the film onto the reel. The advancing mechanism 270 includes a driven gear 271 mounted about shaft 265 and rotatable with respect thereto, and in meshing engagement with a drive gear 272, the drive gear 272 connected to the same shaft 273 as a crank handle 274. Light seals and mechanical bearings are provided at 275 for the shaft 273 where it passes through the housing 226. By rotation of the handle 274, the reel 280 is rotated by projections 282 of gear 271, and film is taken up onto the reel.

Associated with the advancing mechanism 270, located interiorly of the housing 226, there is provided a limited-play indexing means shown generally at 276. The means 276 includes a pointed tooth 277 extending from pivoted plate 278 for engaging the gear 271 to provide limited-play latching thereof, and a spring 279 normally biases the plate 278 into engagement with a stop 283 so that the plate may be pivoted in direction $\alpha$ against the spring bias, but generally not in direction $\beta$. The teeth on the gear member 271 are relatively large to allow some play in the film to release the tension therein, and the tooth 277 is much smaller than the space between teeth of gear 271 also to allow some play in the film. While the stop 283 prevents substantial movement of the plate 278 in direction $\beta$, some small play is provided between the plate 278 and the stop 283 in the normal latching position of the tooth 277 so that even though a gear tooth of gear member 271 has moved just slightly past the pointed tooth 277, it will not be latched in place hard and fast, but some play — to relieve the tension in the film — will be provided. Unless this play in the film is provided, when the film holding means 97 are utilized to hold the film against the flat plate 95, the film could possibly tear or deform. The lost motion in both directions $\alpha$ and $\beta$ of the indexing means 276 prevents this.

In order to initially thread the film through the film housing 42" shown in FIG. 10, a leader must be attached to the film, as shown in FIG. 14. The leading end 290 of the reel film 291 is attached to a relatively heavy leader 292, as with one or more pieces of tape 293. The film 291 may be 105 mm 4 mil film, while the leader 292 is 7 mil, and is long enough so that it can extend from the upper housing 225 through the film housing 42" into the lower housing 226.

An exemplary method of threading the film housing 42" of FIG. 10 is as follows: With the housing 225 detached from film housing 42" and in a darkroom, the cover 251 is removed from housing 225 so that access is gained to the interior thereof, and the plates 248 are moved to their overcenter position (sticking out of housing 225) wherein the roller 247 is spaced from the roller 236. The cover 232 is removed, and a reel of film is placed on the shaft 231. The leader 292 is inserted into housing 225 through the opening 229, and is attached to the leading end 290 of the film 291 by a piece of tape 293. The leader 292, with the film 291 attached, is drawn between the rollers 236, 247, and is passed to and through the passageway 229. The roller 247 is then moved into clamping position, and the cover 251 replaced (the cover 232 is replaced as soon as the film reel is placed on the shaft 231). The upper housing is then removed from the darkroom and the leader 292 with film 291 attached passed to and through the passageway 227 in film housing 42". The upper housing 225 may then be attached to the top of the film housing 42".

With the lower housing 226 detached from the film housing 42", and with the cover 267 removed and no reel in housing 226, the leader 292 is passed through the housing 226 around roller 264, and through the opening covered by cover 267, the leader is detached from the film 291 by removing the tape 293, and the film 291 is wound several times around a reel 280. The reel 280 is then inserted into housing 226 over shaft 265, the lower housing 226 is attached to the film housing 42", and the cover 267 is replaced. The film is then taken up (only a small portion of it having been exposed — just slightly more than the one film frame in the housing 42"), and the camera is ready to operate.

Once the film is provided in the film housing 42" instead of the leader, with the indicating wheel 239 in its initial "0" position and with the roller 247 pinching the film to the roller 236, the film is advanced by the crank 274 until the abutments 241 and 242 engage, and then the film is ready to be advanced frame-by-frame to position it in the film housing 42". This is done by releasing the lever 243, rotating the crank 274 until the abutments 241, 242 again engage, the gear automatically being loosely latched by the indexing means 276, and then moving the film holding mechanism 97 so that the film frame is held tightly in place against flat plate 95. The wheel 239 records each rotation of the roller 236 — which corresponds to the advance of one film frame — and when the last frame is reached, the crank is wound until the film is completely pulled through the camera housing, and the film may be removed through the cover 267 opening for development. Also, at any time, the lower housing 226 may be detached, the film cut above the light sealed opening 262, and the portion of the reel in the housing 226 developed. The only film wastage each time this is done is the film frame in the camera at the time, and the relatively small amount of extra film that is needed to rewind the reel 280.

The cameras according to the present invention may be utilized with a method of moire interferometry (topography) for simultaneous all-around measurement of a living body. A line pattern diapositive may be placed into the xenon flash attachment according to the present invention so that the xenon lamp would then flash the line pattern onto the human body. Another flash attachment could be placed in a different position, probably on the vertical center line of the first flash attachment, and flash a few microseconds after the first line pattern is flashed. The shutter or shutters of the camera system would be open during this multiple flash. In that way, the moire pattern would be recorded on the film of the stereometric camera.

A second possibility is to allow the single xenon flash of the camera to project the line pattern onto the human body and just photograph this line pattern on the subject with one or two camera heads. After the film is developed, the photograph or photographs can be observed by overlaying a ronchi line pattern on top of the photograph or diapositive. Contours will appear in this manner as well. Using the latter technique, after the stereo model has been set up in a plotter, ronchi patterns could also be placed on the diapositives of the stereo pair in the plotter, to calibrate the moire contours in the stereo model. A computer function could assist in the interpolation of the contour positions and intervals on the body, since the positions of the light sources and pattern positions would be known.

It will thus be seen that a stereometric camera assembly has been provided according to the present invention that requires a minimum amount of film, that provides for positive, quick, accurate holding and placement of film for stereometric purposes with a maximum amount of accruacy, provides proper feeding of the film, and that provides for proper fiducial markings of the film for increased accuracy. While the invention has been herein shown and described in what is presently conceived to be the most practical and preferred embodiment, it will be apparent to those of ordinary skill in the art that many modifications may be made thereof within the scope of the present invention, which scope is to be accorded the broadest interpretation of the appended claims so as to encompass all equivalent structures and devices.

What is claimed is:

1. A camera for a stereophotogrammetric assembly, comprising:
   a. a camera housing,
   b. a flat transparent plate in said camera housing,
   c. a lens associated with said housing, said lens being adjustable with respect to said flat plate,
   d. means for adjusting the distance of said lens from said flat plate,
   e. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said flat plate and said member against said flat plate, and (iv) means located exteriorly of said housing attached to said shaft for moving said film engaging member from a position pressing said member into engagement with said film to a position wherein said member is spaced from said flat plate and film disposed between said flat plate and said member may be removed therefrom, and
   f. means for positioning a length of film adjacent said flat plate to be held thereagainst by said holding means, said film positioning means comprising an upper reel assembly and a lower reel assembly; said upper reel assembly including a housing distinct and separable from said camera housing, and said lower reel assembly including a housing distinct and separable from said camera housing, and a vertical through-extending passageway being provided in said camera housing adjacent said film engaging member and said flat plate; and said film positioning means further comprising means for releasably connecting said upper and lower housings to said camera housing in light-sealing relationship therewith and in cooperation with said through-extending passageway in said camera housing.

2. A camera as recited in claim 1 further comprising an indicating means for indicating the consumtion of film from a roll of continuous film mounted on a horizontally extending shaft in a housing of said upper reel assembly, said indicating means including a graduated indicia wheel disposed outside said housing and mounted to a rotatable gear disposed inside said housing and having X + 1 gear teeth, wherein X is an integer greater than one, a first roller for guiding film in said housing, said first roller having a circumference equal to the length of one film frame, and a gear member mounted on said first roller for cooperating with said rotatable gear, said gear member having X gear teeth wherein X is an integer greater than one.

3. A camera as recited in claim 1 wherein said means for releasably connecting said upper and lower housings to said camera housing in light-sealing relationship comprise plush-lined portions of said vertical through-extending passageway adjacent said upper and lower housings, and plush-lined male portions of said upper and lower housings extending into said plush-lined portions of said vertical through-extending passageway.

4. A camera for a stereophotogrammetric assembly, comprising:
   a. a camera housing,
   b. a flat transparent plate in said camera housing,
   c. a lens associated with said housing, said lens being adjustable with respect to said flat plate,
   d. means for adjusting the distance of said lens from said flat plate,
   e. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said flat plate and said member against said flat plate, and (iv) means located exteriorly of said housing attached to said shaft for moving said film engaging member from a position pressing said member into engagement with said film to a position wherein said member is spaced from said flat plate and film disposed between said flat plate and said member may be removed therefrom, and
   f. means for positioning a length of film adjacent said flat plate to be held thereagainst by said holding means, said film positioning means comprising an upper reel assembly and a lower reel assembly mounted on the top and bottom of said camera housing respectively and in tight-sealing relationship therewith and cooperating with a vertical through-extending passageway in said housing adjacent said film engaging member and said flat plate, said upper reel assembly including a housing, a roll of continuous film having a plurality of film frames adapted to be mounted on a horizontally extending shaft in said housing, and a pinch roll assembly mounted in said housing for metering the correct amount of film for each exposure, for providing proper film tension, and for guiding the film from the reel into proper relationship with the film holding means, said pinch roll assembly including a first roller having a static preventing covering, and a second roller movable with respect to said first roller and spring-biased toward engagement with said first roller to pinch film between said first and second rollers.

5. A camera as recited in claim 4 including a metering assembly associated with said first roller, said metering assembly including an abutment radially extending from the periphery of said first roller, and an abutment arm mounted on the upper reel assembly housing and having one position wherein it is in interfering engagement with said abutment extending from said first roller and blocks rotation of said first roller, and another position wherein it is out of interfering engagement with said abutment extending from said first roller, and wherein the circumference of said first roller is equal to the length of one film frame of said roll of film.

6. A camera as recited in claim 5 wherein said second roller is mounted on an overcenter mechanism so that in one position of said second roller it is held in spring-biased engagement with said first roller, or a piece of film on said first roller, and in another position thereof it is held out of engagement with said first roller, spaced therefrom.

7. A camera as recited in claim 6 further comprising a removable cover disposed over an opening in said housing for allowing access to said first and second rollers to provide for movement of said second roller from said one position thereof to said another position thereof.

8. A camera for a stereophotgrammetric assembly comprising:
   a. a camera housing,
   b. a flat transparent plate in said camera housing,
   c. a lens associated with said housing, said lens being adjustable with respect to said flat plate,
   d. means for adjusting the distance of said lens from said flat plate,
   e. means for holding a film length flatly against said flat transparent plate during exposure of said film, said means comprising (i) a film engaging member, (ii) a shaft operatively connected at one end thereof to said film engaging member, (iii) means for biasing said film engaging member into engagement with said flat plate, for flatly pressing a film length located between said flat plate and said member against said flat plate, and (iv) means located exteriorly of said housing attached to said shaft for moving said film engaging member from a position pressing said member into engagement with said film to a position wherein said member is spaced from said flat plate and film disposed between said flat plate and said member may be removed therefrom, and
   f. means for positioning a length of film adjacent said flat plate to be held thereagainst by said holding means, said film positioning means comprising an upper reel assembly and a lower reel assembly mounted on the top and bottom of said camera housing respectively and in light-sealing relationship therewith and cooperating with a vertal through-extending passageway in said housing adjacent said film engaging member and said flat plate, said lower reel assembly comprising a housing, a take-up reel adapted to be mounted on a horizontally extending shaft in said housing, and a film advancing mechanism associated with said take-up reel and said shaft, and said film advancing mechanism including a limited-play indexing means to provide limited play latching of said shaft in a rotatable position to which it is moved so that enough play to relieve the tension in the film will be provided so that the film will not be damaged when moved into operative relationship with said flat plate by said film length holding means.

9. A camera as recited in claim 8 wherein said film advancing mechanism further includes a first gear with pins for engaging the reel mounted on said shaft and rotatable with respect to said shaft, and a second gear mounted on a crank and rotatable with the crank, said second gear being mounted in said housing, and said crank being mounted out of said housing.

10. A camera as recited in claim 9 wherein said limited-play indexing means includes a pivotally mounted, spring-biased plate having a pointed tooth thereof in operative engagement with the relatively large teeth of said first gear, and a stop for said pivotally mounted spring-biased plate.

* * * * *